United States Patent Office 3,078,281
Patented Feb. 19, 1963

3,078,281
DYESTUFFS OF THE ANTHRAQUINONE SERIES AND THEIR PRODUCTION
Willy Braun and Ernst Hartwig, Heidelberg, Germany, assignors to Badische Anilin- & Soda-Fabrik Aktiengesellschaft, Ludwigshafen (Rhine), Germany
No Drawing. Filed Mar. 28, 1960, Ser. No. 17,768
Claims priority, application Germany Mar. 28, 1959
6 Claims. (Cl. 260—372)

This invention relates to new valuable dyestuffs of the anthraquinone series which contain at least once the radical of an arylsulfone attached by way of an imino group, and to a process for the production of such dyestuffs. More specifically the invention relates to dyestuffs of the anthraquinone series of the general formula:

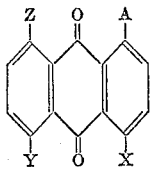

in which A represents the group of the general formula

(in which R represents an aliphatic, aromatic or heterocyclic radical) and the radicals X, Y and Z are identical or different monovalent radicals, such as the group A, a hydrogen atom, an amino group, a nitro group, an alkoxyl group, a hydroxyl group or an acylamino group, and to a process for the production of these dyestuffs.

Radicals of arylsulfones are for example the radicals of arylalkylsulfones, diarylsulfones, arylcycloalkylsulfones, arylaralkylsulfones or arylsulfones of heterocyclic compounds.

Aliphatic radicals are for example linear or branched alkyl radicals, such as low molecular weight alkyl radicals, for example methyl, ethyl, isopropyl or normalbutyl radicals, and heterocyclic radicals are for example nitrogenous mono- or di-nuclear heterocyclic radicals, such as the gamma-pyridyl radical. Examples of aromatic radicals are aryl radicals containing up to three condensed rings, such as phenyl or naphthyl radicals. These aromatic radicals may in turn contain the simple radicals usual in dyestuff chemistry, as for example hydroxyl groups or alkoxyl groups, such as low molecular weight alkoxyl groups, for example methoxyl or ethoxyl groups. As amino groups there may be mentioned especially primary amino groups but also secondary or tertiary amino groups, such as mono- or dialkylamino groups or arylamino groups. Acylamino groups are for example amino groups acylated with aliphatic or aromatic carboxylic acids, such as the acetylamino group, formylamino group or benzoylamino group.

We have found that new valuable dyestuffs of the abovementioned kind are obtained by reacting an anthraquinone derivative which contains at least one reactive amino group preferably in alpha-position with a monohalogenarylsulfone.

The said dyestuffs preferably contain the radical of an arylsulfone attached once to twice by way of an imino group.

As anthraquinone derivatives which contain at least one reactive amino group there may be mentioned anthraquinone compounds which contain attached to the anthraquinone nucleus at least one primary or secondary amino group and possibly other substituents or attached rings. Anthraquinone compounds which have one or more primary amino groups are of special interest, as for example 1- or 2-aminoanthraquinone, 1,5-diaminoanthraquinone, 1-amino-4-hydroxyanthraquinone, 1-amino-4-methoxyanthraquinone, 1-amino-4- or -5-benzoylaminoanthraquinone, 1-amino-2,4-dibromanthraquinone, 1,4-diaminoanthraquinone, 1,8 - diaminoanthraquinone, 1-amino - 4-nitroanthraquinone, 2-amino-3,4-phthaloylacridone and 4- or 5-aminoanthrapyrimidine. When starting from 1-amino-4-nitroanthraquinone as initial material it is possible, after the reaction with a monohalogenaryl sulfone, to convert the nitro group present in 4-position on the anthraquinone ring into an amino group in the usual way.

Monohalogenarylsulfones, such as monochlor- or monobromarylsulfones, are for example monohalogenarylalkylsulfones, monohalogendiarylsulfones, monohalogenarylcycloalkylsulfones, monohalogenarylaralkylsulfones and the monohalogenarylsulfones of heterocyclic compounds. Of these initial materials, especially of the 2- or 4-halogenphenylsulfone series, the following examples are given: 2-, 3- or 4-chlor- or -brom-diphenylsulfone, 4-brom-4'-methoxydiphenylsulfone, 4-brom-4'-hydroxydiphenylsulfone, 4 - brom - 4'-methyldiphenylsulfone and the corresponding diphenylsulfones which bear the said substituents in 2- or 3- position, phenylnaphthylsulfones, such as 2- or 4-bromphenylalpha- or -beta-naphthylsulfone, for example the 4-bromophenylnaphthylsulfone obtainable by reaction of para-brombenzenesulfonic acid chloride with naphthalene, 4-chlor- or -brom-phenylmethyl- or -ethylsulfone, 3- or 4-chlor- or -brom-phenylcyclohexylsulfone and 4-brom- or -chlorphenyl-alpha- or -gamma-pyridylsulfone. The initial materials of the 4-halogenphenylsulfone series are of quite special interest for the new process.

The reaction of the anthraquinone derivatives containing at least one reactive amino group with the monohalogenarylsulfones is carried out as a rule in an organic solvent and/or diluent and in the presence of a catalyst. It is preferable to add agents for binding acids to the reaction mixture and to separate any water formed by the addition of such agents. Suitable organic solvents and/or diluents are for example high boiling alcohols, such as normal- or iso-butanol and the amyl alcohols, or aromatic nitrated or halogenated hydrocarbons, such as orthodichlorbenzene, 1,3,5-trichlorbenzene and nitrobenzene. Copper and copper compounds are suitable as catalysts. Suitable acid-binding agents are for example the alkali salts of carbonic acid, such as sodium or potassium carbonate and sodium bicarbonate, or the salts of strong bases with weak acids, such as sodium acetate or sodium dihydrogen phosphate. In many cases it is preferable to replace the organic solvent and/or diluent by water or by a mixture of water with water-miscible organic solvents and/or diluents and if necessary to work in a closed vessel under pressure. If it is desired to achieve short reaction periods, the reaction of the anthraquinone derivatives containing at least one reactive amino group with the monohalogenarylsulfones is advantageously carried out in fused salts, for example in alkali metal acetates, such as sodium or potassium acetate, or mixtures of the same and in the presence of the above-mentioned catalysts.

Irrespective of whether the reaction is carried out in organic liquid, aqueous liquid, in mixtures of organic solvents and/or diluents with water, or in fused alkali metal acetates, the most favorable reaction temperature is different in each case and can readily be ascertained by experiment. As a rule the reaction temperature lies within the temperature range of 50° to 30° C., mainly between 160° and 240° C.

In the production of the new dyestuffs it is preferable to use an amount of monohalogenarylsulfone which is at least equimolecular to each amino group contained in the anthraquinone derivative which may also possibly contain other substituents or attached rings. For example in the reaction of one mol of a monoaminoanthraquinone compound it is advantageous to start with about 1.1 mols of a monohalogenarylsulfone. A greater excess of monohalogenarylsulfone is however not injurious to the course of the reaction. The reaction period is as a rule between 5 and 50 hours. In fused salt of the above-mentioned kind, the reaction may be completed even after 30 to 300 minutes.

The new dyestuffs are as a rule obtained in great purity and with very good yields in this way. If necessary, the dyestuffs may be further purified by additional measures, as for example by sublimation, by recrystallization from suitable solvents, such as nitrobenzene, N,N-dimethylformamide or N,N-dimethylacetamide or by treatment with aqueous alkali metal hypochlorite solutions.

The dyestuffs obtainable according to this invention may be used not only as pigments but also in dissolved form for dyeing materials of natural and synthetic substances. They may serve as pigments, for example for spin dyeing threads of cellulose acetate, viscose or polyacrylonitrile and/or copolymers of acrylonitrile. Their great stability to heat makes the new dyestuffs especially suitable for dyeing polystyrene or linear polyamides in bulk. The dyeings of bulk-dyed materials have as a rule an excellent fastness to light which is not impaired by the usual additions, as for example by titanium dioxide.

By reason of their excellent fastness to light and their excellent heat stability, the dyestuffs of the general formula:

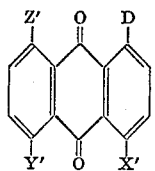

II are of special interest in which D represents a group of the general formula:

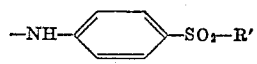

in which in turn R' may represent the radical

or the radical —CH$_3$, and in which each of the radicals X', Y' and Z' represents a hydrogen atom, the group D or the group

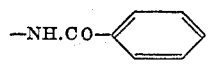

These dyestuffs are especially well suited for dyeing polystyrene in bulk. Some of these dyestuffs give excellent pigments for spin-dyeing viscose.

The following examples will further illustrate this invention but the invention is not restricted to these examples. Parts and percentages are by weight.

*Example 1*

A mixture of 22 parts of 1-aminoanthraquinone, 30 parts of 4-chlordiphenylsulfone, 8 parts of anhydrous sodium carbonate, 4 parts of anhydrous sodium acetate and 0.5 part of finely divided copper oxide are suspended in 100 parts of anhydrous nitrobenzene and the mixture heated while stirring so that it boils gently until no further water escapes. About 36 hours are required for this purpose. After cooling, the reaction product is filtered off by suction, washed with nitrobenzene and the filtered material treated with steam in the presence of aqueous hydrochloric acid until no further nitrobenzene escapes. The material is washed free from acid and dried. 42 parts of a well crystallized red-orange colored compound which melts at 245° to 246° C. are obtained.

The dyestuff obtained can be further purified by sublimation (melting point 247° to 249° C.) or by recrystallization from suitable solvents, for example from nitrobenzene or N,N-dimethylformamide (melting point 248° to 250° C.). The pure compound has a sulfur content of 7.3%. The dyestuff yields red lacquers of excellent fastness to light. It is especially well suited for dyeing polystyrene in bulk. Red dyeings are thereby obtained which do not bleed out and which have excellent stability to light and heat. The new dyestuff has the following structure:

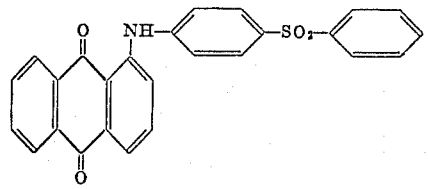

III

The dyestuff is obtained in the same good yield and purity by using the corresponding amount of 4-bromdiphenylsulfone instead of 4-chlordiphenylsulfone.

The same dyestuff is also obtained by stirring a mixture of 44 parts of 1-aminoanthraquinone, 80 parts of 4-bromidphenylsulfone, 16 parts of sodium carbonate, 14 parts of crystallized sodium acetate, 2 parts of finely ground copper oxide and 300 parts of water for 24 hours at 220° C. in a pressure vessel. The reaction material is separated by suction filtration and it is then washed with water and then with hot methanol and dried. 77 parts of the above described dyestuff are thereby obtained.

*Example 2*

A mixture of 22 parts of 1-aminoanthraquinone, 33 parts of 4-brom-4'-methoxydiphenylsulfone, 8 parts of anhydrous sodium carbonate, 4 parts of anhydrous sodium acetate and 0.5 part of finely divided copper oxide are stirred with gentle boiling in 100 parts of dry nitrobenzene until no further water escapes. About 40 hours are required for this purpose. The mixture is then allowed to cool completely, the reaction material is filtered off by suction, washed with nitrobenzene and the filtered material treated with steam in the presence of aqueous hydrochloric acid until it is free from nitrobenzene. The material is then washed free from acid and dried. A brilliant orange-red crystal powder is obtained having the melting point 234° to 236° C. and a nitrogen content of 3%. The dyestuff thus obtained dyes polystyrene in bulk in orange-red shades of excellent stability to light and temperature. It has the following constitution:

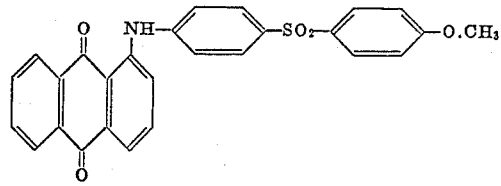

IV

If the 4% brom-4'-methoxydiphenylsulfone be replaced by the equivalent amount of 4-brom-4'-hydroxydiphenylsulfone, a similar dyestuff is obtained which has a free hydroxyl group and is constituted as follows:

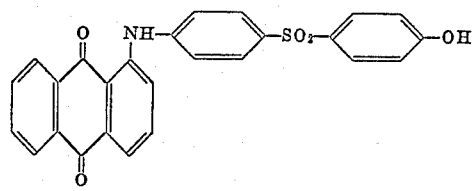

V

*Example 3*

A mixture of 10 parts of 1,5-diaminoanthraquinone, 30 parts of 4-bromdiphenylsulfone, 16 parts of anhydrous sodium carbonate, 4 parts of anhydrous sodium acetate, 0.5 part of basic copper acetate and 120 parts of nitrobenzene is gently boiled while stirring until no further water is separated. About 48 hours are required for this purpose. Working up is carried out in the same way as in Example 1. 26 parts of a red crystal powder are obtained which melts at 346° to 348° C. and has a sulfur content of 9.2%. The dyestuff is very well suited for the spin-dyeing of viscose. The fastness to light of the resultant, eminently washproof red dyeings is outstanding. Moreover the new dyestuff dyes polystyrene in bulk in red shades of excellent stability to light and heat. The dyestuff has the following structure:

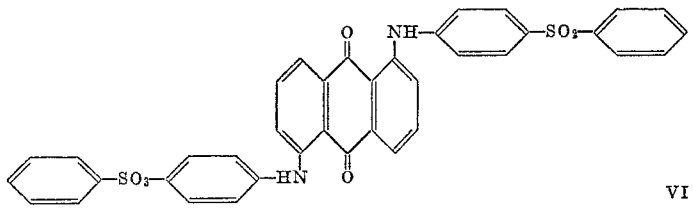

A similar dyestuff is obtained in a good yield and purity by using the equivalent amount of 4-brom-4'-methoxydiphenyl-sulfone instead of 4-bromdiphenylsulfone. This dyestuff corresponds to the following formula:

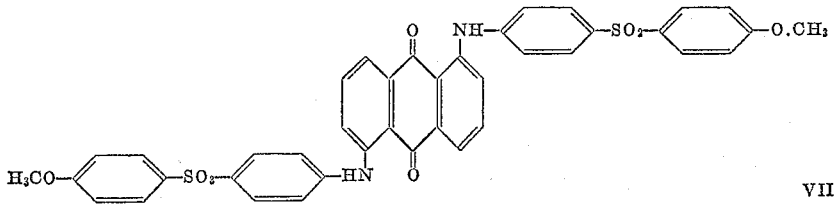

Example 4

A mixture of 24 parts of 1-amino-4-hydroxyanthraquinone, 35 parts of 4-bromdiphenylsulfone, 12 parts of anhydrous sodium carbonate, 4 parts of anhydrous sodium acetate, 0.5 part of copper powder and 160 parts of nitrobenzene is gently boiled while stirring until no more water escapes. About 40 hours are required for this purpose. The reaction mixture is then filtered by suction while still hot and the reaction material washed with hot nitrobenzene. The filtered material is freed from adherent nitrobenzene as described in Example 1. It is then washed free from acid and dried. 30 parts of the pigment dyestuff are obtained in the form of a violet powder of which the melting point is above 360° C. and the nitrogen content is 3%. The new dyestuff has the following structure:

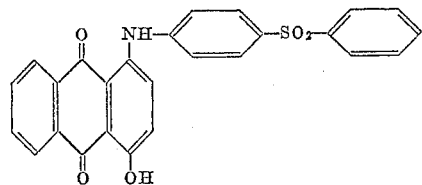

VIII

A similar dyestuff is obtained in the same way when 4-brom-4'-methoxydiphenylsulfone is used as initial material instead of 4-bromdiphenylsulfone. This dyestuff has the following constitution:

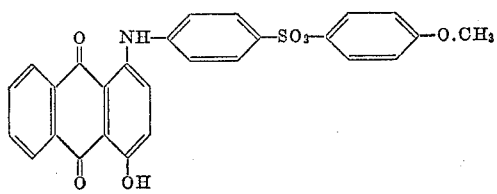

IX

Example 5

A mixture of 15.3 parts of 1-amino-4-benzoylaminoanthraquinone, 15 parts of 4-bromdiphenylsulphone, 8 parts of anhydrous sodium carbonate, 2 parts of anhydrous sodium acetate, 0.5 part of finely divided copper oxide and 100 parts of nitrobenzene are stirred for 20 hours while boiling gently. The water formed is allowed to escape. After cooling, the reaction material is filtered off by suction and washed with nitrobenzene. The filtered material is freed from adherent nitrobenzene as described in Example 2, filtered by suction, washed free from acid with water, washed with methanol and dried. 17.5 parts of a blue-violet crystal powder are obtained which contains 70.8% of carbon, 3.9% of hydrogen, 14.8% of oxygen and 5.1% of nitrogen. The pigment obtained has good tinctorial properties. Dyeing polystyrene in bulk results in dyeings of very good fastness to light and very good stability to heat. The new dyestuff is constituted as follows:

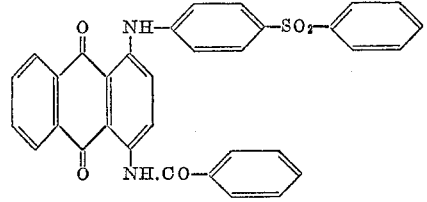

X

An orange-brown dyestuff of the formula:

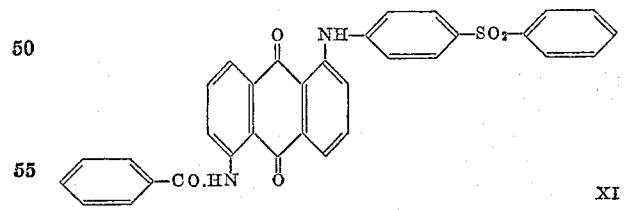

XI is obtained by replacing the 1-amino-4-benzoylaminoanthraquinone by 1-amino-5-benzoylaminoanthraquinone. This dyestuff may also be used excellently for dyeing polystyrene in bulk and yields dyeings of very good fastness to light and very good stability to heat.

A green dyestuff of the formula:

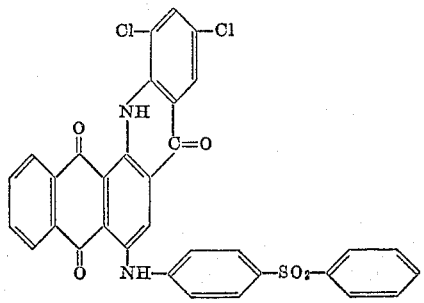

is obtained if the corresponding amount of 4-amino-3',5'-dichloroanthraquinone-2,1(N)-1',2'-(N)benzacridone is reacted with 4-bromdiphenylsulfone in the manner described above.

Example 6

9 parts of anhydrous sodium carbonate and 2 parts of finely divided copper oxide are introduced into a fused mixture of 192 parts of crystallized sodium acetate and 162 parts of potassium acetate. The temperature of the melt is then slowly raised and the water originating from the sodium acetate thereby distilled off. After the temperature has reached 190° C., there is added to the melt a mixture of 24 parts of 1,4-diaminoanthraquinone and 70 parts of 4-bromdiphenylsulfone. The temperature of the melt is then raised to 220° C. and the mixture kept at 220° to 227° C. until the reaction has ended. This is in general the case even after an hour. The mixture is then allowed to cool to about 90° C., water being introduced in small portions. The mixture is then stirred into water, the reaction material filtered off by suction, washed with water, the filtered material triturated with dilute aqueous hydrochloric acid and this suspension then heated at 90° to 100° C. for about half an hour. The dyestuff is then filtered off by suction, washed free from acid, washed with hot methanol and dried. 63 parts of the pigment are obtained in the form of a dark blue-green crystal powder which melts at 314° to 315° C. and has a nitrogen content of 4%. The new dyestuff has the following structure:

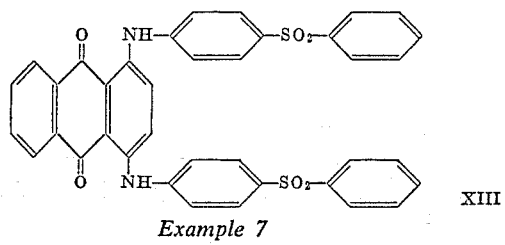

XIII

Example 7

22 parts of 1-aminoanthraquinone, 40 parts of 4-bromphenylnaphthylsulfone (obtained from para-bromobenzenesulfonic acid chloride and naphthalene), 8 parts of anhydrous sodium carbonate, 4 parts of anhydrous sodium acetate, 0.8 part of finely divided copper oxide and 100 parts of amyl alcohol are mixed and heated to boiling under reflux while stirring for about 30 hours. After cooling, the reaction material is filtered off by suction, washed first with amyl alcohol and then with methanol and the moist filtered material then heated for about half an hour with dilute aqueous hydrochloric acid at 90° to 100° C. The dyestuff is filtered off while still hot, washed free from acid with hot water, rinsed with hot methanol and dried. 41 parts of the dyestuff of the formula:

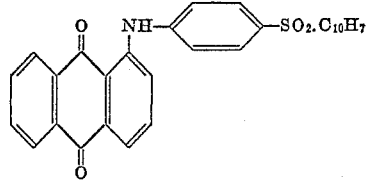

XIV are obtained in the form of a red crystal powder of the melting point 218° to 220° C.

Example 8

22 parts of 1-aminoanthraquinone, 28 parts of 4-bromphenylmethylsulfone, 8 parts of anhydrous sodium carbonate, 4 parts of anhydrous sodium acetate, 0.8 part of finely divided copper oxide and 100 parts of amyl alcohol are mixed and heated to boiling under reflux while stirring for about 35 hours. After the reaction mixture has been cooled, the dyestuff is separated as described in Example 7. 32 parts of the dyestuff are obtained in the form of a red crystal powder which contains about 4% of nitrogen and melts at 237° to 238° C. The new dyestuff is constituted as follows:

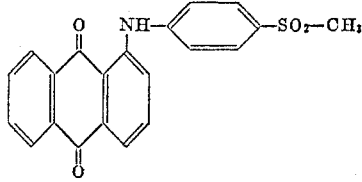

XV and dyes polystyrene in bulk in red shades of excellent fastness to light and excellent stability to heat.

Example 9

A suspension of 23.8 parts of 1,8-diaminoanthraquinone, 56 parts of 4-chlordiphenylsulfone, 16 parts of anhydrous sodium carbonate, 8 parts of anhydrous sodium acetate, 1.6 parts of finely divided copper oxide in 200 parts of nitrobenzene is kept boiling gently while distilling off the water formed by the reaction until no further water passes over, which is the case after about 24 hours. After working up, in a manner corresponding to that in Example 1, 35 parts of a violet crystal powder are obtained which melts at 266° to 268° C. and contains 4.1% of nitrogen. The dyestuff thus obtained dyes polystyrene in bulk in violet shades of excellent stability to light and heat. The new dyestuff has the following constitution:

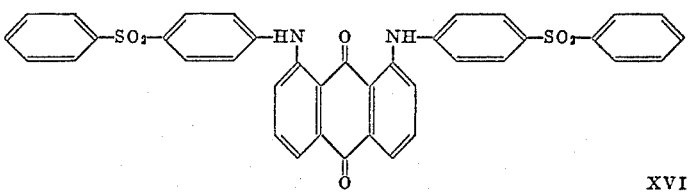

XVI

Example 10

25 parts of 1-amino-4-methoxyanthraquinone, 30 parts of 4-chlordiphenylsulfone, 8 parts of anhydrous sodium carbonate, 4 parts of anhydrous sodium acetate and 0.8 part of finely divided copper oxide are stirred into 100 parts of nitrobenzene and the mixture kept boiling gently until no further water distils over, which is the case after about 20 hours. After working up according to Example 1 there are obtained 34.5 parts of a violet crystal powder which melts at 248° to 251° C. and contains about 3% of nitrogen. The dystuff has the following structure:

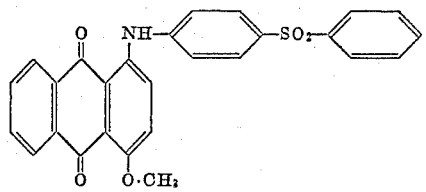

XVII

Example 11

A violet dyestuff is also obtained by using the equivalent amount of 1-amino-4-nitroanthraquinone as initial material in Example 10 instead of 1-amino-4-methoxy-anthraquinone. In the resulting dyestuff of the formula:

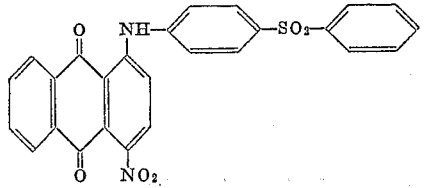 XVIII the nitro group may be reduced to the amino group in the usual way, for example with sodium sulfide, and a reddish-blue dyestuff is obtained having the formula:

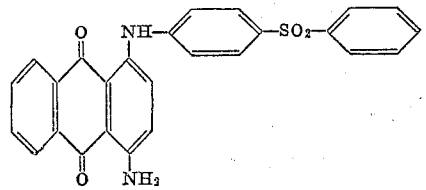 XIX

*Example 12*

11.2 parts of 1-aminoanthraquinone, 16.4 parts of 4-bromophenyl-gamma-pyridylsulfone (obtainable by heating pyridylpyridinium chloride with 4-bromophenylsulfinic acid in dilute aqueous ethanol), 4 parts of anhydrous sodium carbonate, 2 parts of anhydrous sodium acetate and 0.4 part of finely divided copper acetate in 50 parts of nitrobenzene are stirred while gently boiling while distilling off water until no further water passes over. The reaction is ended after about 24 hours. The reaction mixture is then allowed to cool slowly and allowed to stand at room temperature for about 12 hours to improve the crystallization. After filtration by suction, the reaction product is washed twice with a little nitrobenzene, then with methanol to remove adherent nitrobenzene, and then freed from inorganic components with hot water. After drying there are obtained 16 parts of a red crystal powder which melts at 223° to 225° C. and contains 6.3% of nitrogen. The new dyestuff has the following constitution.

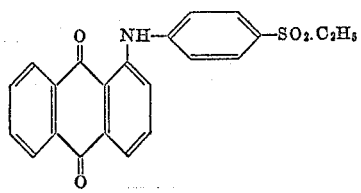 XX

*Example 13*

A suspension of 22 parts of 1-aminoanthraquinone, 30 parts of bromphenylethylsulfone, 8 parts of anhydrous sodium acetate, 0.8 part of finely divided copper oxide in 80 parts of amyl alcohol are boiled under reflux for about 24 hours while stirring. Then 8 parts of glycol monomethyl ether are introduced into the hot reaction mixture and the mixture allowed to cool slowly while stirring. After standing for 12 to 15 hours at room temperature, the crystals which have separated from the reaction mixture are filtered off by suction, washed three times with a mixture of amyl alcohol and glycol monomethyl ether (10:1), rinsed with methanol and the filtered material boiled for about half an hour with dilute aqueous hydrochloric acid. The product is filtered off by suction, washed free from acid and dried. 33 parts of the dyestuff of the formula:

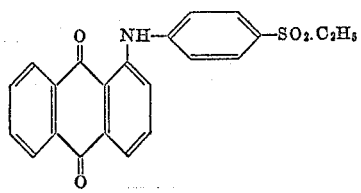 XXI are thus obtained. The new dyestuff, obtained in the form of red crystal leaflets, melts at 315° to 320° C. and contains about 3.7% of nitrogen.

We claim:

1. A dyestuff selected from the class consisting of the compounds of the formulae

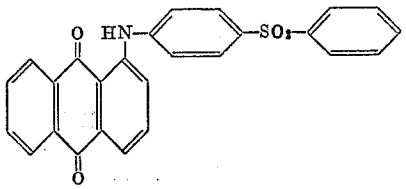

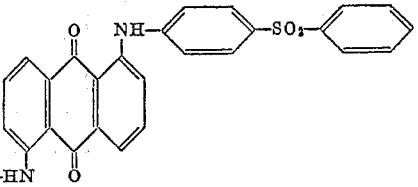

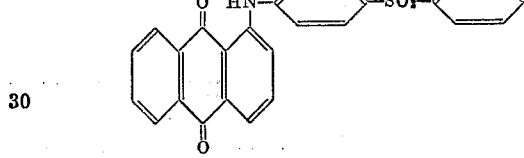

and

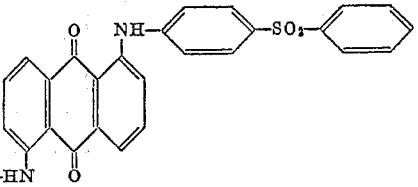

2. The dyestuff of the formula

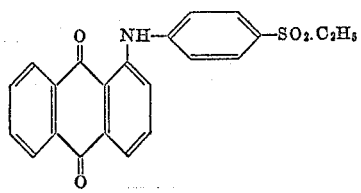

3. The dyestuff of the formula:
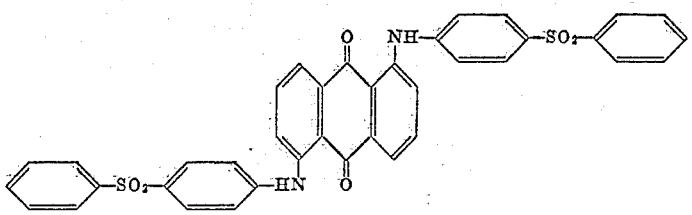
4. The dyestuff of the formula:
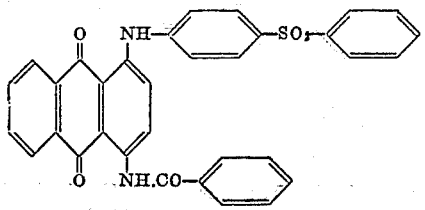
5. The dyestuff of the formula:
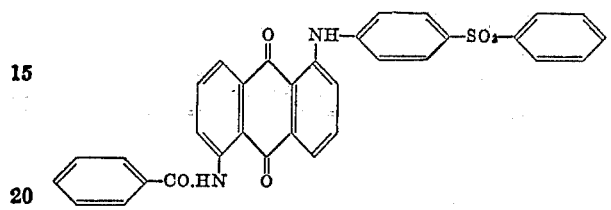
6. The dyestuff of the formula:
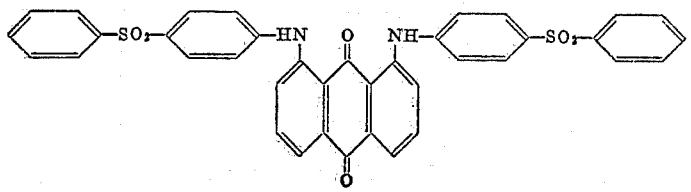
References Cited in the file of this patent
UNITED STATES PATENTS
| | | |
|---|---|---|
| 1,935,929 | Zahn et al. | Nov. 21, 1933 |
| 2,356,060 | Irving et al. | Aug. 15, 1944 |
| 2,364,349 | Dickey | Dec. 5, 1944 |
| 2,439,626 | Kern | Apr. 13, 1948 |
| 2,614,108 | Jenny | Oct. 14, 1952 |
| 2,614,109 | Jenny | Oct. 14, 1952 |
| 2,908,684 | Martin et al. | Oct. 13, 1959 |

UNITED STATES PATENT OFFICE
CERTIFICATE OF CORRECTION

Patent No. 3,078,281                      February 19, 1963

Willy Braun et al.

It is hereby certified that error appears in the above numbered patent requiring correction and that the said Letters Patent should read as corrected below.

Column 5, lines 13 to 21, and lines 26 to 35, the lower left-hand portion of each formula, for "—$SO_3$—", each occurrence, read -- —$SO_2$— --.

Signed and sealed this 24th day of December 1963.

(SEAL)
Attest:

ERNEST W. SWIDER
Attesting Officer

EDWIN L. REYNOLDS

Acting Commissioner of Patents